United States Patent [19]
Christopher

[11] 4,280,023
[45] Jul. 21, 1981

[54] STYLUS POSITION SENSING APPARATUS FOR VIDEO DISC PLAYER

[75] Inventor: Todd J. Christopher, Indianapolis, Ind.

[73] Assignee: RCA Corporation, New York, N.Y.

[21] Appl. No.: 55,976

[22] Filed: Jul. 9, 1979

[51] Int. Cl.³ .............................................. G11B 3/38
[52] U.S. Cl. ........................................ 369/43; 369/61; 369/126; 369/219
[58] Field of Search ............... 179/100.4 R, 100.4 M, 179/100.1 G; 274/13 R, 15 R, 23 A; 360/75, 77; 358/128.3

[56] References Cited

U.S. PATENT DOCUMENTS

| | | | |
|---|---|---|---|
| 2,915,315 | 12/1959 | Rabinow | 274/13 R |
| 3,572,724 | 3/1971 | Rabinow | 274/13 R |
| 3,872,265 | 3/1975 | Hilliker | 179/100.4 M |
| 4,080,625 | 3/1978 | Kawamoto et al. | 179/100.4 M |
| 4,149,730 | 4/1979 | Bois et al. | 274/23 A |
| 4,163,994 | 8/1979 | Sakamoto et al. | 360/77 |
| 4,164,756 | 8/1979 | Toda et al. | 358/128 |

FOREIGN PATENT DOCUMENTS

| | | | |
|---|---|---|---|
| 2818845 | 11/1978 | Fed. Rep. of Germany | 274/23 A |
| 1361610 | 7/1974 | United Kingdom | 274/23 A |
| 496596 | 3/1976 | U.S.S.R. | 274/23 A |

*Primary Examiner*—John H. Wolff
*Assistant Examiner*—Donald McElheny, Jr.
*Attorney, Agent, or Firm*—E. M. Whitacre; J. S. Tripoli; D. A. Kulkarni

[57] ABSTRACT

In a video disc player, a stylus arm, carrying a track-following stylus at one end thereof, has its other end secured to an arm cage by a compliant member. The arm cage is translated along a path disposed radially of the disc record during playback. Pickup circuits are employed for sensing the variations in a signal representative capacitance formed between an electrode incorporated in the pickup stylus and conductive material disposed in the record to recover prerecorded information from a spiral track disposed on the record. A stylus position indicative capacitance, established between a first electrode secured to the stylus arm and coupled to the pickup circuits and a second electrode mounted to the carriage in the vicinity of the first electrode, is modulated at a given frequency rate. Circuitry is provided for sensing signals at a given frequency appearing at the output of the pickup circuits to generate a signal indicative of the position of the pickup stylus relative to the arm cage. The rate of translation of the carriage is varied in response to the stylus position indicative signal to maintain a desired relationship between the pickup stylus and the arm cage.

3 Claims, 7 Drawing Figures

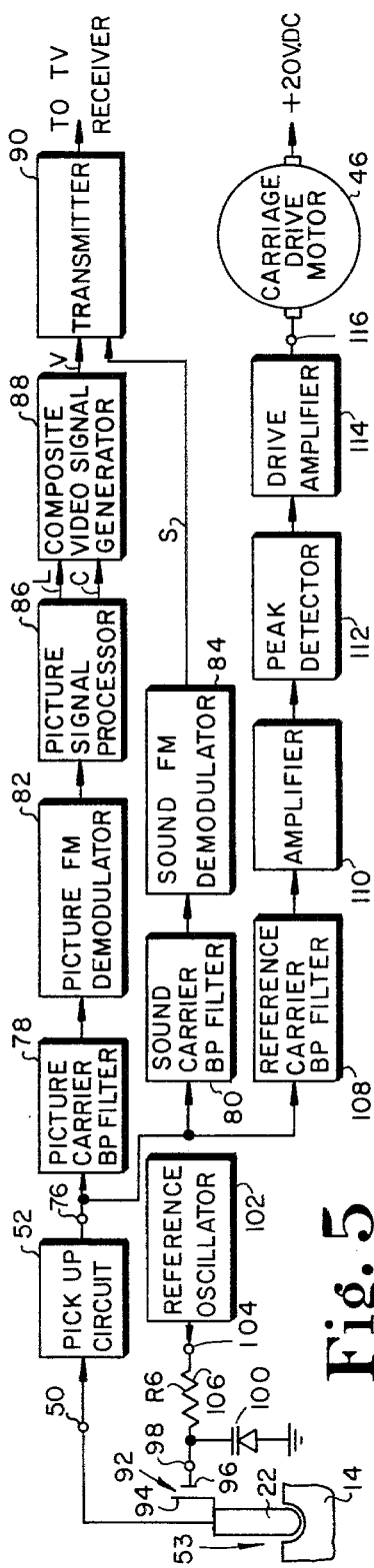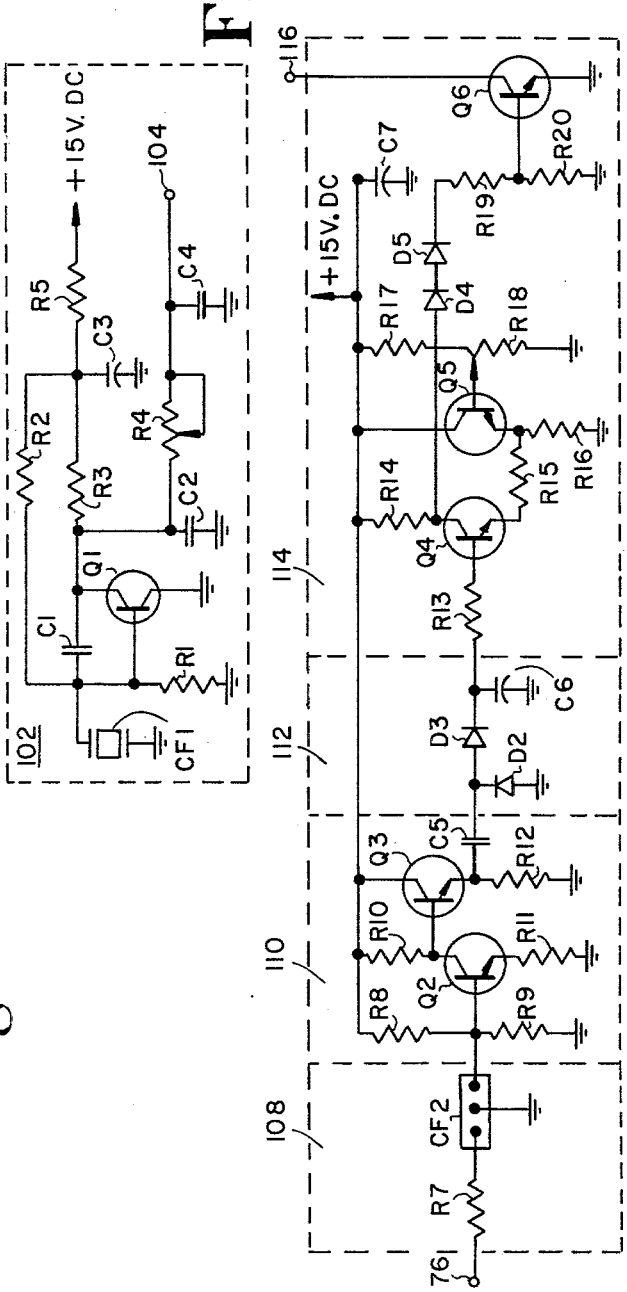

STYLUS POSITION SENSING APPARATUS FOR VIDEO DISC PLAYER

This invention relates to an apparatus for sensing the relative position of a track-following stylus with respect to an independently-driven arm carriage suitable for use in a video disc player.

In a certain high density information record system, signals are recorded in the form of geometric variations in the bottom of a smooth spiral groove disposed on a disc record, the surface of which comprises conductive material covered with a thin coating of dielectric material. The record player includes a stylus arm carrying a groove-engaging stylus at its free end, and having its other end secured by a compliant coupler to an arm carriage. A turntable is provided for rotatably supporting the record during playback. The arm carriage is subject to translation, independent of the lateral motion of the groove-engaging stylus, along a path disposed radially of the disc record during playback. Pickup circuits are employed for sensing the variations in the signal representative capacitance established between an electrode incorporated in the pickup stylus and the record conductive material as the record is rotated to recover prerecorded signals. U.S. Pat. No. 3,842,194, issued to Clemens describes a capacitance pickup system of the abovementioned type.

In the playback of disc records having high groove densities (e.g., of the order of 9,000 to 10,000 groove convolutions per inch), conditions are occasionally encountered when the presence of some form of discontinuity in the disc groove causes the pickup stylus to skip across groove convolutions rather than follow the successive convolutions of the spiral groove in a continuous progression. Depending on the nature of a defect, an encounter of the stylus with the defect may result in an inward deflection of the pickup stylus (i.e., forward skip) or an outward deflection thereof (i.e., backward skip). In some instances, the outward deflection of the stylus is repeated a number of times causing the stylus to retrace one or more previously traversed convolutions, and thereby producing repeat play with annoying effects on picture display and sound reproduction. Such a repeat traversal of groove convolutions is referred to hereinafter as a "locked groove" occurrence.

In systems of the foregoing type, it is desirable to make a provision for correction of the locked groove problems, for example, by causing inward displacement of the pickup stylus upon occurrence of a locked groove to relocate the stylus to a point along the continuation of the spiral groove beyond the defect causing the backward groove skips.

The apparatus used for relocating the stylus from one groove convolution to another, in addition to its use for the locked groove correction function, is also suitable for providing special effects such as fast/slow forward motion, fast/slow reverse motion, repeat play and search. U.S. patent application, Ser. No. 039,358, filed on May 15, 1979 in the name of Simshauser describes an illustrative track skipper apparatus.

Effective operation of the track skipping systems of the type described above requires that a fixed spatial relationship be maintained between the pickup stylus and the arm carriage. To this end, a system, in accordance with the instant invention, is herein described for sensing the relative position of the stylus with respect to the arm carriage. The instant system includes a pickup stylus position indicative capacitance formed between a first electrode secured to the stylus and a second electrode mounted to the carriage near the first electrode. Circuits coupled to the stylus position indicative capacitance sense the variations therein to provide a signal representative of the stylus relative position.

In accordance with a further feature of the invention, the rate of translation of the carriage is varied in response to the stylus position representative signal in a manner that maintains an advantageous spatial relationship between the stylus arm and the carriage.

IN THE DRAWINGS

FIG. 1 is a diagrammatic representation of a capacitance type of video disc player incorporating the stylus position sensing apparatus pursuant to the subject invention;

FIG. 2 schematically illustrates the principles of the capacitance pickup system;

FIG. 3 presents a perspective view of a pickup cartridge suitable for use with the stylus position sensing apparatus of FIG. 1, the pickup cartridge being shown upside down to expose its features;

FIG. 5 shows in block diagram form the player electronics including circuitry for the stylus position sensing apparatus of the instant invention; and FIGS. 6 and 7 illustrate schematic circuit diagrams for realizing various functions of the stylus position sensing system of FIG. 5.

Figure 1:
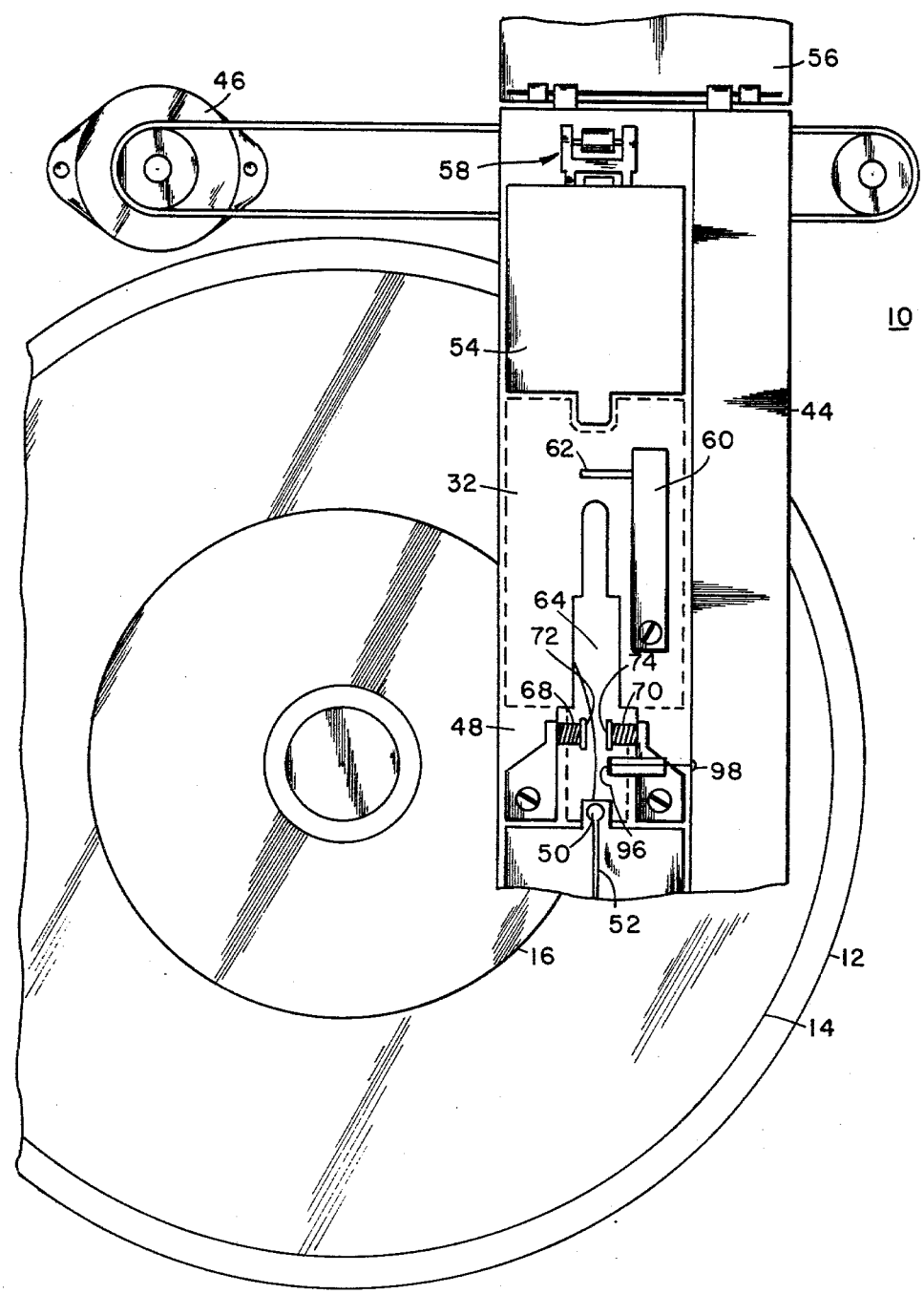
Figure 2:
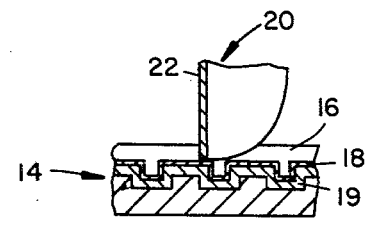

FIG. 1 diagrammatically illustrates a video disc player 10 having a turntable 12 for rotatably supporting a disc record 14. A motor drives the turntable to rotate at proper speed. U.S. Pat. No. 3,912,283, issued to Hammond, et al., describes an illustrative turntable drive system. Video signals are recorded, as schematically shown in FIG. 2, in the form of undulations in the bottom of a smooth spiral groove 16 disposed on the disc record, the surface of which comprises a thin coating of dielectric material 18 overlying conductive material 19. A pickup stylus 20 incorporates a conductive electrode 22 which forms a signal representative capacitance with the record conductive material when the stylus is lowered on the record for playback. The signal representative capacitance varies in accordance with the signals recorded on the disc as stylus/record relative motion is established. The player employs pickup circuits responsive to the signal representative capacitance variations for reconstructing recorded signals.

Figure 3:
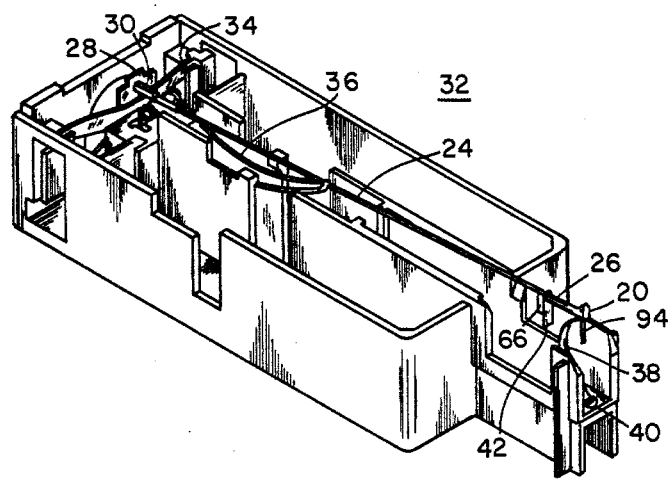
Figure 4:
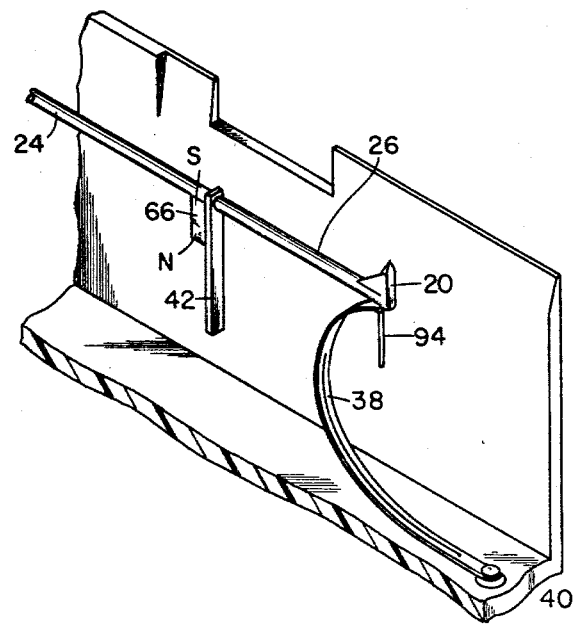
FIG. 4 depicts a perspective view of a portion of the upside-down pickup cartridge of FIG. 3, partially broken away to illustrate the details thereof.

The pickup stylus 20 is secured to the free end of a stylus arm 24 by means of a stylus holder 26 in the manner shown in FIGS. 3 and 4. The other end of the stylus arm 24 is secured to a connector plate 28 by means of a compliant coupler 30. The connector plate is suspended in a pickup cartridge 32 by means of a flexible diaphragm 34. A U-shaped spring 36 serves to retain the delicate stylus assembly within the confines of the cartridge body during its storage and handling. A conductive leaf spring 38 (i.e., flylead) connects the pickup electrode 22 to a terminal 40 on the cartridge body. An extension 42 is disposed on the stylus holder for constraining side-to-side excursions of the stylus.

The player includes an arm carriage 44 which is subject to translation along a path disposed radially of the disc record 14 placed on the turntable 12. As shown schematically in FIG. 1, a variable speed, DC motor 46 causes translation of the carriage at an appropriate speed in the manner described subsequently.

The carriage 44 is provided with a compartment 48 for removably receiving the pickup cartridge 32. Placement of the cartridge in the carriage compartment establishes electrical contact between the cartridge terminal 40 and a terminal 50 of a pickup circuit 52. Mounted in the carriage is an armstretcher apparatus 54. When the cartridge is installed in the carriage and a lid 56 of the carriage is closed a mechanism 58, responsive to the lid movement, pushes the armstretcher toward the cartridge to effect mechanical engagement between the cartridge connector plate 28 and a translatable support disposed on the armstretcher. The armstretcher 54 imparts translatory motion to the stylus in a manner that opposes cyclical deviations in the stylus/record relative velocity during playback. The cyclical deviations in the stylus/record relative velocity result from a number of sources, for example, eccentricity, warp, etc. U.S. Pat. No. 3,983,318 (Miller) describes an illustrative armstretcher apparatus.

Also disposed in the carriage is a stylus arm lifting/lowering apparatus 60. The lifting/lowering apparatus serves (1) to gently lower the pickup stylus on the record for playback, (2) to lift the stylus away from the record in the pause mode of the player, and (3) to raise the stylus for allowing it to clear the record bead as the carriage moves from an off-record rest position to an on-record play position. When the lid 56 is closed, a tab disposed thereon defeats the stylus arm retaining spring 36, permitting the stylus arm 24 to rest on a support member 62 of the lifting/lowering apparatus. The bottom wall of the carriage has an opening 64 through which the pickup stylus is lowered for playback. Reference may be made to U.S. Pat. No. 4,053,161 (Bleazey) for a more detailed description of the stylus arm lifting/lowering apparatus.

The Simshauser track skipper apparatus (U.S. patent application, Ser. No. 039,358) comprises a small, lightweight permanent magnet 66 secured on the back side of the extension 42, and a pair of large diameter, air-core coils 68 and 70 disposed about plastic bumpers 72 and 74 mounted in the carriage. It will be noted that the bumpers 72 and 74 limit the side to side excursions of the extension 42 disposed on the stylus arm. The skipper coils are connected such that upon energization, they generate aiding magnetic fields. The permanent magnet is so dimensioned that its north pole is interposed between the coils when the stylus is lowered for playback. The stylus arm is displaced inward or outward depending upon the polarity of the actuating pulse applied to the coils. As previously indicated, the track skipper apparatus serves a multitude of functions, such as locked groove clearance, special effects, active searches, etc.

FIG. 5 is a block diagram representation of player elecronics including circuitry for the stylus position sensing apparatus in accordance with the subject invention. The circuitry employed to recover the signals recorded on the disc will be explained first. As shown in FIG. 5, the terminal 50 of the pickup circuit 52 is coupled to the conductive stylus electrode 22. The pickup circuit, responsive to the variations in the signal representative capacitance 53 formed between the stylus electrode 22 and the conductive material of the record 14, provides at the output terminal 76 thereof audio and video signals recorded on the disc. Reference may be made to U.S. patents issued to Carlson, et al. (U.S. Pat. No. 3,872,240) and Kawamoto, et al. (U.S. Pat. No. 4,080,625) for descriptions of illustrative pickup circuits. The output of the pickup circuit 52 is delivered to a pair of bandpass filters 78 and 80. The picture carrier bandpass filter 78 has a relatively wide passband encompassing the deviation range of the high frequency picture carrier (e.g., 4.3 to 6.3 MHz) as well as the requisite adjacent sideband regions, and selectively passes the picture carrier component of the recorded signal to the relative exclusion of the sound carrier component thereof. The sound carrier bandpass filter 80 has a relatively narrow passband encompassing the deviation range of the low frequency sound carrier (e.g., 716 KHz±55 KHz) as well as the requisite adjacent sideband regions, and selectively passes the sound carrier component of the recorded signal to the relative exclusion of the picture carrier component thereof.

The outputs of the respective bandpass filters 78 and 80 are passed to respective demodulators 82 and 84. The picture demodulator 82 develops at its output terminal the picture signal information inclusive of synchronizing components, and the sound demodulator 84 develops at its output terminal the audio signal information.

A picture signal processor 86, coupled to the picture demodulator, effects the separation of the chrominance information from the luminance information. A composite video signal generator 88 recombines the chrominance and the luminance information in accordance with, for example, the NTSC format. A transmitter circuit 90 processes the sound, luminance and the chrominance information to form a signal suitable for delivery to a conventional color TV receiver, wherein color image displays may be developed in accordance with the recorded information. U.S. Pat. No. 4,097,899, issued to J. P. Yu, describes an illustrative transmitter circuit.

The player electronics also includes circuits coupled to the output of the signal pickup for detecting the occurrence of locked grooves on the record. An illustrative locked groove detection scheme is described in U.S. patent application, Ser. No. 908,516, filed on May 22, 1978 in the name of Palmer, now U.S. Pat. No. 4,198,658. The locked groove correction signal is applied to the coils 68 and 70 to effect locked groove clearance.

The stylus position sensing apparatus, pursuant to the principles of the subject invention, will now be described in conjunction with FIGS. 5–7. The subject apparatus includes a stylus position indicative capacitance 92 established between a first electrode 94 secured in fixed relation to the stylus arm 24 and electrically connected to the flylead 38, and a second electrode 96 coupled to a terminal 98 disposed on the arm carriage 44 in the vicinity of the first electrode as shown in FIG. 5. Illustratively, the first electrode is 0.005 inches by 0.075 inches and the second electrode is 0.020 inches by 0.100 inches. The stylus position indicative capacitance 92 is arranged in series with a varactor diode 100. The varactor diode 100 is coupled to the output terminal 104 of a 260 KHz, reference oscillator 102 by means of a resistor 106. The stylus position indicative capacitance 92 is modulated by the spacing between the stylus 20 and the carriage 44, and the capacitance of the varactor diode 100 is modulated by the reference oscillator 102. A schematic circuit diagram suitable for generating the 260 KHz. reference carrier is shown in FIG. 6 and the values of various elements shown therein are presented hereinbelow in a table of values.

The signal pickup circuit 52 additionally serves to sense the variations in the capacitance formed by the stylus position indicative capacitance 92 and the capacitance of the varactor diode 100 disposed in series therewith, which variations appear at the output terminal 76 thereof as a 260 KHz. signal having an amplitude which varies inversely with the spacing between the position sensing electrodes 94 and 96. This signal is separated from the rest of the signals appearing at the output terminal 76 of the pickup circuit by a bandpass filter 108 coupled thereto. The bandpass filter has a passband encompassing the requisite deviation range of the 260 KHz. reference carrier. The separated 260 KHz. signals are amplified by an amplifier 110. A peak detector 112, coupled to the amplifier 110, generates a signal at the output thereof which represents the relative position of the pickup stylus 20 with respect to the arm carriage 44. The peak detector output signal is supplied to a driver amplifier 114 which generates at the output terminal 116 thereof an error correction signal suitable for application to the motor 46, which drives the carriage. The amplitude of the signal applied to the carriage motor is such that the spacing between the stylus and the carriage is maintained at a predetermined optimum level. A schematic circuit suitable for realizing the foregoing functions is illustrated in FIG. 7, and the values of various elements shown therein are also given in the attached table.

It is noted that although the stylus position sensing apparatus is utilized herein for varying the rate of translation of the arm carriage in the manner that maintains a desired spacing between the pickup stylus and the arm carriage, it is also suitable for other purposes, such as detection of locked grooves on the disc. Moreover, it is important to understand that while the description herein is in the context of grooved discs, it is equally applicable to flat discs. Various defects on flat discs can cause the pickup stylus to retrace the same track again and again. The instant system can be advantageously employed to clear such occurrences in the playback of flat disc.

TABLE OF VALUES

Illustratively, the values of various elements utilized in FIGS. 5–7 are specified below.

I. CAPACITORS:
(1) C1—0.01 microfarad
(2) C2—1,000 picofarad
(3) C3—1.0 microfarad
(4) C4—220 picofarad
(5) C5—0.01 microfarad
(6) C6—2.2 microfarad
(7) C7—10.0 microfarad II. RESISTORS:
(1) R1—10.0 Kilohms
(2) R2—10.0 Kilohms
(3) R3—7.5 Kilohms
(4) R4—100.0 Kilohms
(5) R5—13.0 Kilohms
(6) R6—4.7 Kilohms
(7) R7—3.0 Kilohms
(8) R8—39.0 Kilohms
(9) R9—2.0 Kilohms
(10) R10—4.3 Kilohms
(11) R11—82.0 Ohms
(12) R12—4.7 Kilohms
(13) R13—10.0 Kilohms
(14) R14—10.0 Kilohms
(15) R15—62.0 Ohms
(16) R16—510.0 Ohms
(17) R17—7.5 Kilohms
(18) R18—1.0 Kilohms
(19) R19—5.0 Kilohms
(20) R20—10.0 Kilohms

III. DIODES:
(1) VD1—1477949-1
(2) D2-3—1N60
(3) D4-5—1N914

IV. TRANSISTORS:
(1) Q1—1417330-3
(2) Q2-5—MPSA17
(3) Q6—MPSU05

V. MISCELLANEOUS:
(1) CF1—260 KHz. Ceramic resonator
(2) CF2—260 KHz. Ceramic filter

What is claimed is:

1. In a system for recovering prerecorded signals from a disc record having information recorded thereon along a spiral track disposed on the surface thereof by means of a track-following stylus; said system including a pickup circuit coupled to an electrode incorporated in the stylus for sensing the variations in a signal representative capacitance formed by said pickup electrode and conductive material disposed in said record to recover said prerecorded signals at the output terminal thereof; apparatus comprising:

(a) a carriage subject to translation along a path disposed radially of said disc record;
   (b) compliant means for securing said stylus to said carriage;
   (d) first means including a stylus position indicative capacitance defined by a first electrode secured in fixed relation to said stylus and coupled to said pickup circuit and a second electrode mounted to said carriage adjacent to said first electrode; said first means further including means coupled to said second electrode and modulated at a given frequency rate; and
   (e) second means coupled to said pickup circuit output terminal for deriving signals at said given frequency to the relative exclusion of said prerecorded signals for generating a signal indicative of the relative position of said stylus with respect to said carriage along said path.

2. Apparatus as defined in claim 1 further including means responsive to said stylus position indicative signal for varying the rate of translation of said carriage in a manner that maintains a desired lateral spacing between said stylus and said carriage.

3. Apparatus as defined in claim 1 wherein said modulated means includes a varactor diode coupled in series with a source of said given frequency oscillations.

* * * * *